United States Patent
Weeter

(10) Patent No.: US 9,322,440 B2
(45) Date of Patent: Apr. 26, 2016

(54) CLUTCH COOLING MECHANISM

(71) Applicant: GM Global Technology Operations LLC, Detroit, MI (US)

(72) Inventor: Greg Alan Weeter, Ann Arbor, MI (US)

(73) Assignee: GM Global Technology Operations Inc., Detroit, MI (US)

( * ) Notice: Subject to any disclaimer, the term of this patent is extended or adjusted under 35 U.S.C. 154(b) by 135 days.

(21) Appl. No.: 14/183,143

(22) Filed: Feb. 18, 2014

(65) Prior Publication Data

US 2015/0233430 A1  Aug. 20, 2015

(51) Int. Cl.
*F16D 25/12* (2006.01)
*F16D 25/08* (2006.01)

(52) U.S. Cl.
CPC ............ *F16D 25/123* (2013.01); *F16D 25/083* (2013.01); *F16D 25/087* (2013.01)

(58) Field of Classification Search
CPC ....... F16D 25/12; F16D 25/123; F16D 25/08; F16D 25/082; F16D 25/083; F16D 25/087; F16D 2300/0212
See application file for complete search history.

(56) References Cited

U.S. PATENT DOCUMENTS

| | | | | |
|---|---|---|---|---|
| 4,456,111 A | * | 6/1984 | Limbacher | F16D 25/085 192/30 V |
| 5,366,054 A | * | 11/1994 | Cooke | F16D 25/085 192/70.17 |
| 8,485,333 B2 | | 7/2013 | Hogberg | |
| 2002/0060116 A1 | * | 5/2002 | Otto | F16D 25/083 192/18 A |
| 2013/0240319 A1 | | 9/2013 | Weeter | |
| 2013/0306429 A1 | | 11/2013 | Weeter | |

* cited by examiner

*Primary Examiner* — Jacob S Scott

(57) ABSTRACT

A clutch release mechanism for a vehicle powertrain is provided. The clutch release mechanism includes a piston operable to move in an axial direction along a central axis toward and away from a clutch assembly. An actuator bearing is disposed adjacent to the piston. The actuator bearing is configured to be pressed against the clutch assembly by the piston, and the actuator bearing is configured to rotate around the central axis. A plurality of fins is disposed around the actuator bearing and configured to rotate with the actuator bearing about the central axis.

20 Claims, 3 Drawing Sheets

CLUTCH COOLING MECHANISM

FIELD

The present disclosure relates to a clutch release mechanism for a motor vehicle powertrain, and more particularly to a clutch release mechanism that provides for improved cooling.

BACKGROUND

The statements in this section merely provide background information related to the present disclosure and may or may not constitute prior art.

Clutches for motor vehicle powertrains provide a frictional, variable torque transmitting coupling between the vehicle prime mover and the transmission. Typically, this torque transmitting assembly includes a clutch assembly that couples an engine output shaft with a transmission input shaft, unless pressure is exerted upon a pressure plate to disengage the clutch assembly and allow rotation between the engine output shaft and the transmission input shaft. A clutch release mechanism is used to actuate against a spring to exert pressure on the pressure plate to disengage the clutch assembly.

Significant heat may be developed in the clutch plates, the clutch housing, and the pressure plate surface, especially if the vehicle is driven hard or the clutch is operated partially engaged for any period of time. Typically, heat dissipation concerns are addressed by employing larger clutch plates, more numerous clutch plates, a larger flywheel, more robust clutch materials (facings), among other design approaches.

Increasing the size of a clutch, while advantageous from heat generation and dissipation viewpoints, is not an engineering solution without serious consequences. For example, it adds to the overall weight of the vehicle, increases the size of the overall powertrain and its packaging, and increases the fuel consumption of the associated vehicle as well as its performance.

Accordingly, there exists a need for a clutch cooling mechanism that does not significantly adversely affect the vehicle weight, size, or fuel consumption.

SUMMARY

The present disclosure provides a clutch release mechanism that provides for improved cooling in the bell housing of the transmission by employing a plurality of fins attached to an actuator bearing.

In one aspect, which may be combined with or separate from the other aspects described herein, a clutch release mechanism for a vehicle powertrain is provided. The clutch release mechanism includes a piston operable to move in an axial direction along a central axis toward and away from a clutch assembly. The clutch release mechanism also includes an actuator bearing disposed adjacent to the piston. The actuator bearing is configured to be pressed against the clutch assembly by the piston, and the actuator bearing is configured to rotate around the central axis. A plurality of fins is disposed around the actuator bearing and configured to rotate with the actuator bearing about the central axis.

In another aspect, which may be combined with or separate from the other aspects described herein, a vehicle powertrain subassembly for use with a manual transmission is provided. The vehicle powertrain subassembly includes an engine output shaft and a transmission input shaft. A clutch assembly selectively connects the engine output shaft to the transmission input shaft for common rotation together. A clutch release mechanism is included, which is configured to selectively release the engine output shaft from the transmission input shaft. The clutch release mechanism includes an actuator bearing configured to rotate around a central axis. A piston is operable to move in an axial direction along the central axis, and the piston is operable to press the actuator bearing against the clutch assembly to release the engine output shaft from the transmission input shaft. A plurality of fins is disposed around the actuator bearing and configured to rotate with the actuator bearing about the central axis.

In another aspect, which may be combined with or separate from the other aspects described herein, a vehicle powertrain subassembly for use with a manual transmission is provided. The vehicle powertrain subassembly includes a clutch assembly configured to selectively connect an engine output shaft to a transmission input shaft for common rotation together. A clutch release mechanism is included and is configured to selectively release the engine output shaft from the transmission input shaft. The clutch release mechanism includes an actuator bearing configured to rotate around a central axis. A piston is operable to move in an axial direction along the central axis, and the piston is operable to press the actuator bearing against the clutch assembly to release the engine output shaft from the transmission input shaft. A plurality of fins is disposed around the actuator bearing and configured to rotate with the actuator bearing about the central axis. A bell housing surrounds the clutch assembly and the clutch release mechanism.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
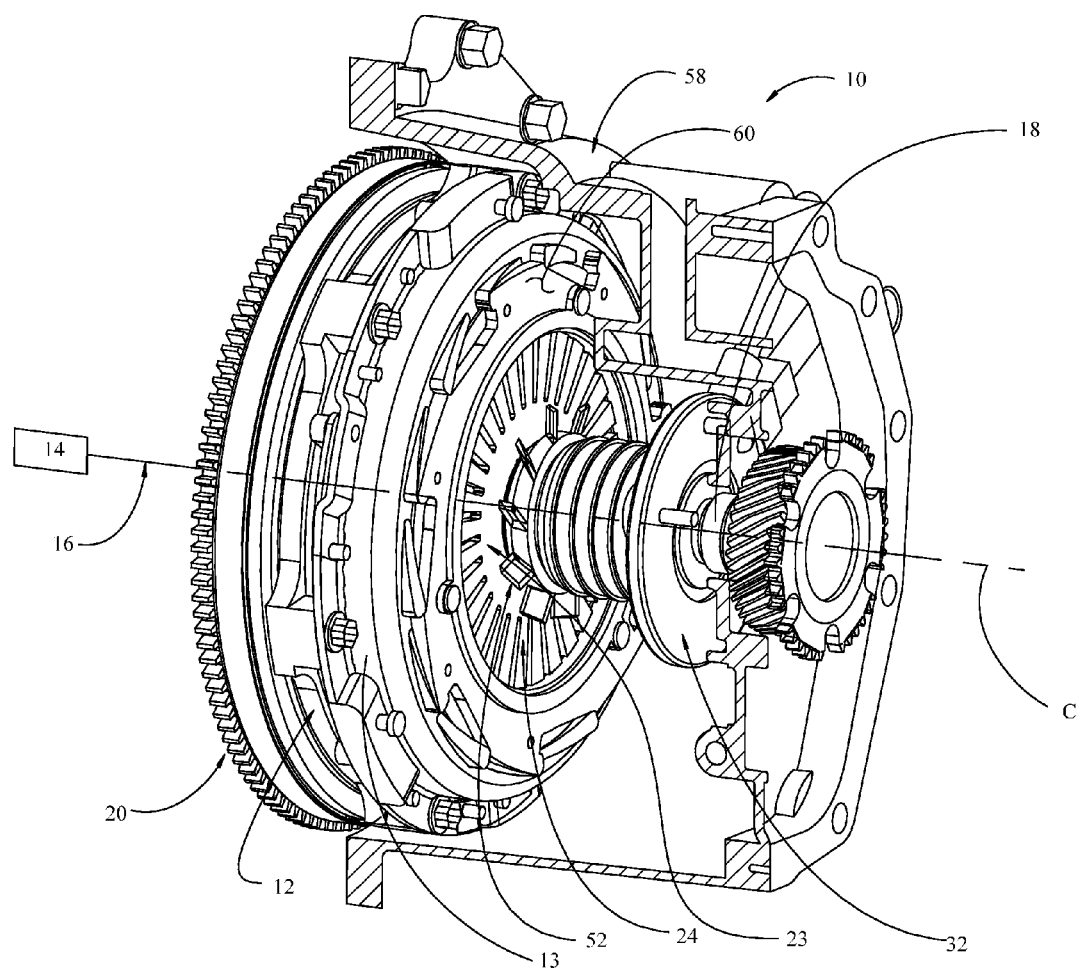
FIG. 1 is a partially cut-away perspective view of a vehicle powertrain subassembly incorporating a clutch release mechanism, in accordance with the principles of the present disclosure.
Figure 2:
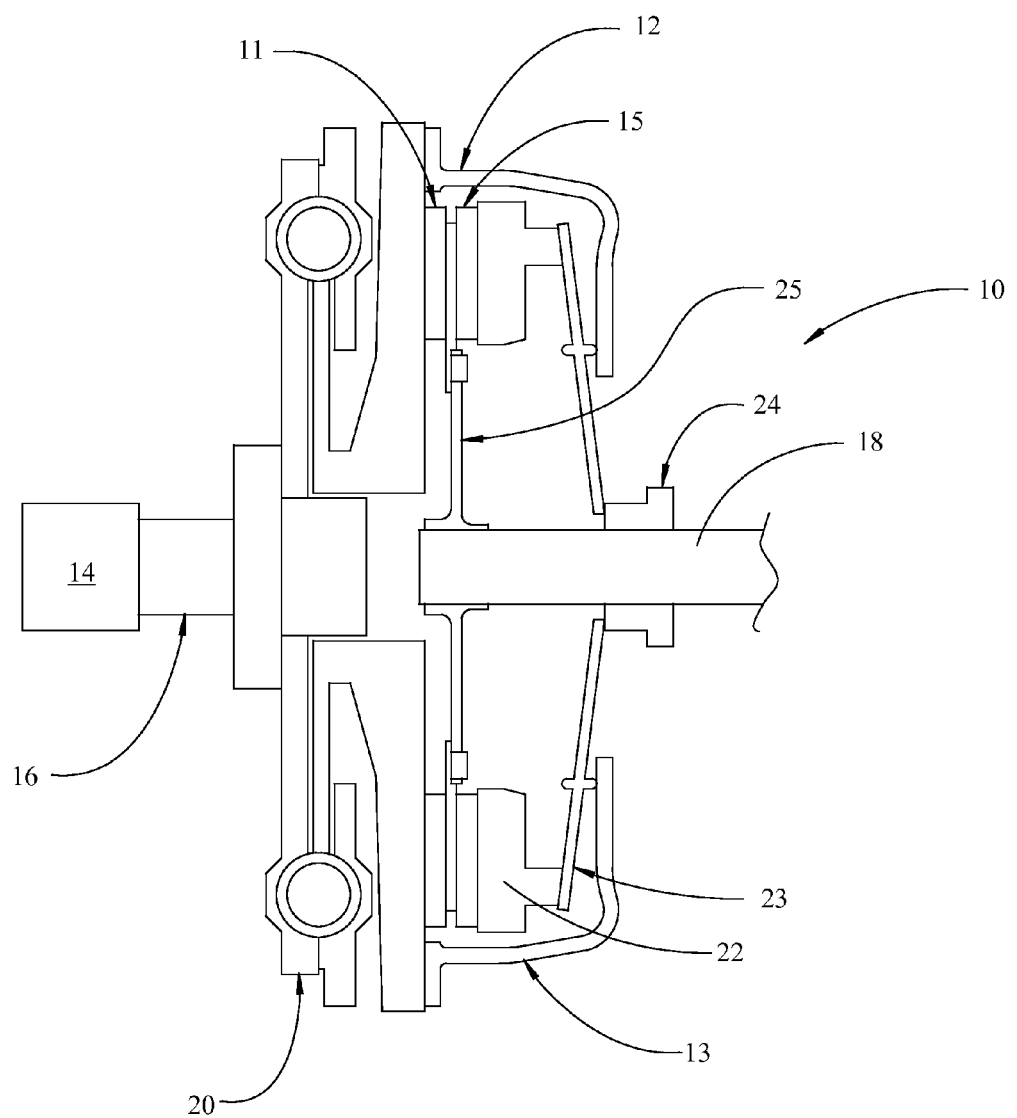
FIG. 2 is a schematic side cross-sectional view of the vehicle powertrain subassembly of FIG. 1, according to the principles of the present disclosure.

With reference to FIGS. 1-2, a portion of a motor vehicle powertrain is illustrated and generally designated by the number 10. The motor vehicle powertrain 10 includes a clutch assembly 12 which includes a typically cast exterior metal housing 13 which locates, secures and protects the various components of the clutch assembly 12, such as a plurality of clutch plates 11, 15. The clutch assembly 12 is supplied with drive torque from a prime mover (shown schematically at 14) such as/a gasoline, Diesel, flex fuel or hybrid power plant or engine, by an engine output shaft/clutch input member (shown schematically at 16) and supplies drive torque to a transmission through a transmission input (clutch output) shaft 18. It should be understood that the transmission with which the present invention is utilized may be either a manual transmission or an automatic transmission, for example, a dual clutch transmission (DCT).

The engine output/clutch input member 16 is coupled to the clutch assembly 12, which may include a conventional dual mass flywheel 20 and a spring damper assembly. The clutch assembly 12 may be, for example, a dry manual clutch, or it may be another manual (directly operator controlled) clutch or a clutch controlled by a hydraulic, pneumatic or electric actuator.

The clutch assembly 12 may include, for example, one or more input side or first clutch plates or disks 11 which are disposed on an opposite side of and in operating, i.e., selective torque transferring, relationship with one or more output side or second, double sided clutch plates or disks 15. The second side clutch plate or plates 15 is disposed adjacent to a pressure plate 22, which is coupled to a diaphragm spring 23 that is acted upon by a clutch release mechanism 24. A plurality of shock absorbing isolator springs may be disposed in an isolator plate 25 between the output side clutch plate or disk 15 and the transmission input (clutch output) shaft 18. From the clutch assembly 12, the transmission input shaft 18 extends into a transmission housing (not shown), where it is typically supported for rotation on an anti-friction roller bearing assembly and transmits power to other transmission components and ultimately to the wheels of the vehicle.

The clutch assembly 12 selectively connects the engine output shaft 16 to the transmission input shaft 18 for common rotation together. In a typical embodiment, the clutch assembly 12 normally couples the engine output 16 and the transmission input 18 together unless acted upon by the clutch release mechanism 24. Accordingly, the clutch release mechanism 24 is configured to selectively release the engine output shaft 16 from the transmission input shaft 18 when pressure is applied to the pressure plate 22 and the diaphragm spring 23 by the clutch release mechanism 24 to release the pressure applied to the second side clutch plate(s) 15. It should be understood, however, that other configurations of the clutch assembly 12 could be used, such as a clutch assembly 12 that only connects the engine output and transmission input shafts 16, 18 when acted upon by the clutch release mechanism 24, by way of example (thus, the clutch release mechanism 24 would be a clutch applying mechanism, in such an embodiment).

Figure 3:
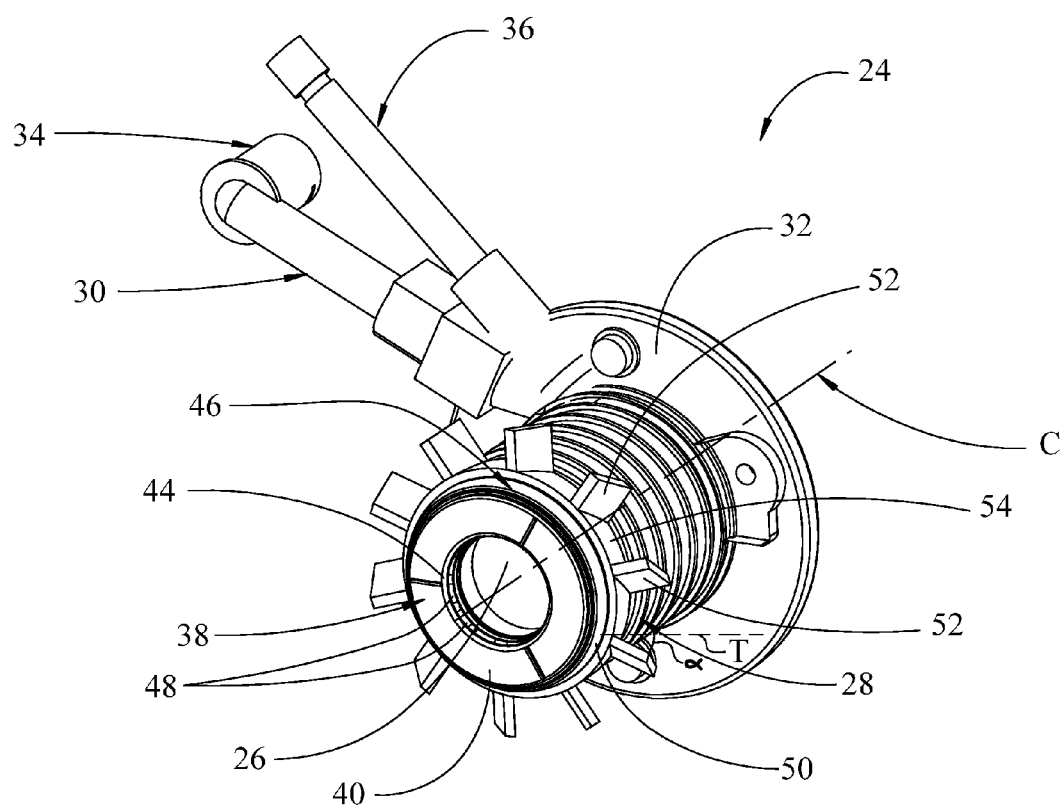
FIG. 3 is a perspective view of the clutch release mechanism of FIGS. 1 and 2, according to the principles of the present disclosure.

The clutch release mechanism 24, shown in FIGS. 1-3, is a hydraulic cylinder mechanism, which is a concentric slave cylinder, in this variation. The clutch release mechanism 24 includes a piston 26 disposed in a concentric piston cylinder that is surrounded by a protective boot 28. The piston 26 is operable to move in an axial direction along the central axis C toward and away from the diaphragm spring 23, the pressure plate 22, and the rest of the clutch assembly 12 within the concentric piston cylinder that is surrounded by the protective boot 28. A supply channel 30 is configured to supply hydraulic fluid pressure to a CSC housing actuator 32 of the clutch release mechanism 24. A high pressure port 36 of the supply channel 30 connects the CSC housing actuator to a powertrain hydraulic system. A bleed stem 34 is configured to remove air from the clutch release mechanism 24.

An actuator bearing 38 is disposed adjacent to and rotatably connected to the piston 26. The actuator bearing 38 is configured to rotate around a central axis C. The actuator bearing 38 has an actuator face 40 that is selectively pressed against the diaphragm spring 23 by the piston 26. The actuator bearing 38 may rotate with respect to the piston 26, however, the actuator bearing 38 is typically fixed to the piston 26 in an axial direction such that the actuator bearing 38 and the piston 26 move together along the central axis C, toward and away from the diaphragm spring 23, the pressure plate 22, and the rest of the clutch assembly 12.

In some embodiments, the actuator bearing 38 may remain in slipping contact with the diaphragm spring 23, even with the clutch release mechanism 24 is not actuated, while in other embodiments, the actuator bearing 38 may be spaced a distance away from the diaphragm spring 23 when the clutch release mechanism 24 is not actuated.

The piston 26 is operable to press the actuator bearing face 40 against the diaphragm spring 23 to release the engine output shaft 16 from the transmission input shaft 18. When the CSC housing actuator 32 is actuated, the piston 26 moves along the axis C toward the diaphragm spring 23 and pressure plate 22 and away from the CSC housing actuator 32 to press the actuator bearing face 40 against the diaphragm spring 23, which causes the engine output 16 to separate from the transmission input 18, or at least to allow slipping therebetween.

The actuator bearing 38 has an inner race 44 that is fixedly connected to the piston 26, and an outer race 46 that is disposed opposite the inner race 44. A plurality of ball bearings 48 may be disposed therebetween. Accordingly, the outer race 46 may rotate with respect to the inner race 44 and the piston 26.

The outer race 46 has an outer surface 50 having a plurality of fins 52 disposed around the perimeter of the outer surface 50. More specifically, the fins 52 are unitarily formed with a ring 54 that is disposed on the outer surface 50, in this example. Thus, the plurality of fins 52 are disposed around the outer race 46 of the actuator bearing 38 and are configured to rotate with the outer race 46 of the actuator bearing 38 about the central axis C, typically at engine speed or with the engine output shaft 16.

In the illustrated example, the fins 52 are spaced equidistantly around the outer perimeter of the outer race 46. Each fin 52 forms an angle α with respect to a tangent line T at the intersection of the fin 52 and the outer surface 48 or the ring 54 that rests upon the outer surface 48. The angle α may be in the range of about 15 degrees to about 45 degrees, by way of example. In some variations, the angle α may be about 30 degrees. Ten fins 52 are included in the clutch release mechanism 24 illustrated, however, it should be understood that more or fewer fins 52 could be used.

A transmission bell housing 58 surrounds the clutch assembly 12, including the pressure plate 22 and the diaphragm spring 23, and the clutch release mechanism 24. In other words, the bell housing 58 defines an interior space 60 therein, and the clutch release mechanism 24 and the clutch assembly 12 are located within the interior space 60 of the bell housing 58.

Because the fins 52 are located away from the highest temperature region in the interior space 60 of the bell housing 58, the fins 52 and the ring 54 may be formed of a metal or a polymer. In some variations, the fins 52 and the ring 54 may be formed of glass-reinforced nylon.

The outer race 46 of the actuator bearing 38, including the fins 52 disposed thereon, spin at engine speed. Accordingly, the fins 52 act as fan blades—a spinning fan—within the interior space 60 of the bell housing 58. Therefore, the fins 52 create a volume of cool air flow within the interior space 60 of the bell housing 58. The air flow if directed toward the high temperature clutch assembly 12, resulting in lower temperatures within the interior space 60 of the bell housing 58. Maximizing air flow in the interior space 60 of the bell housing 58 can reduce the temperature of the clutch assembly 12, and specifically the clutch disks and the cover of the clutch assembly 12. This reduces wear of the clutch assembly 12, increasing the lifespan of the clutch assembly 12, and it may also allow a smaller clutch assembly 12 to be used, which may result in cost savings, weight and size reduction, and lower fuel consumption. Since these are rotating components, weight reduction not only reduces vehicle weight but also rotating inertia and thus improves vehicle performance. Such cooling also reduces the operating temperature of the clutch hydraulic fluid which reduces the friction and hysteresis of the apply system.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch release mechanism for a vehicle powertrain, the clutch release mechanism comprising:
    a piston operable to move in an axial direction along a central axis toward and away from a clutch assembly having a diaphragm spring;
    an actuator bearing disposed adjacent to the piston and having an outer race, the actuator bearing configured to be pressed against the diaphragm spring of the clutch assembly by the piston, the actuator bearing configured to rotate around the central axis; and
    a plurality of fins disposed around an outer perimeter of the outer race of the actuator bearing and configured to rotate with the actuator bearing about the central axis and move air.

2. The clutch release mechanism of claim 1, wherein the actuator bearing is rotatably attached to the piston, the actuator bearing being configured to move with the piston in the axial direction.

3. The clutch release mechanism of claim 2, the actuator bearing also having an inner race disposed opposite the outer race, the inner race being rotatably fixed to the piston and the outer race rotatable around the piston and the inner race.

4. The clutch release mechanism of claim 3, wherein each fin of the plurality of fins is spaced equidistantly around the outer perimeter of the outer race.

5. The clutch release mechanism of claim 4, wherein the outer race has an outer surface, the plurality of fins being disposed on the outer surface.

6. The clutch release mechanism of claim 5, further comprising a ring disposed on the outer surface, each fin of the plurality of fins being unitarily formed with the ring.

7. The clutch release mechanism of claim 5, wherein each fin forms an angle with respect to a tangent line at the intersection of the fin and the outer surface, the angle being in the range of about 15 degrees and 45 degrees.

8. The clutch release mechanism of claim 7, wherein the angle is about 30 degrees.

9. The clutch release mechanism of claim 7, wherein the plurality of fins comprises ten fins.

10. The clutch release mechanism of claim 6, further comprising a piston cylinder disposed concentrically around the piston, the piston operable to move axially within the piston cylinder.

11. The clutch release mechanism of claim 10, further comprising a supply channel configured to supply fluid pressure to the clutch release mechanism and a bleed stem configured to remove air from the clutch release mechanism.

12. The clutch release mechanism of claim 11, wherein the plurality of fins is formed of at least one of metal and a polymer.

13. The clutch release mechanism of claim 12, wherein the plurality of fins is formed of glass-reinforced nylon.

14. A vehicle powertrain subassembly for use with a manual transmission, the vehicle powertrain subassembly comprising:
    an engine output shaft;
    a transmission input shaft;
    a clutch assembly having a diaphragm spring, said clutch assembly selectively connecting the engine output shaft to the transmission input shaft for common rotation; and
    a clutch release mechanism configured to selectively release the engine output shaft from the transmission input shaft, the clutch release mechanism comprising:
        an actuator bearing configured to rotate around a central axis and having an outer race;
        a piston operable to move in an axial direction along the central axis, the piston operable to press the actuator bearing against the diaphragm spring of the clutch assembly to release the engine output shaft from the transmission input shaft; and
        a plurality of fins disposed around an outer perimeter of the outer race of the actuator bearing and configured to rotate with the actuator bearing about the central axis and move air.

15. The vehicle powertrain subassembly of claim 14, further comprising a bell housing defining an interior space, the clutch release mechanism being located within the interior space of the bell housing.

16. The vehicle powertrain subassembly of claim 15, the actuator bearing also having an inner race disposed opposite the outer race, the inner race being rotatably fixed to the piston and the outer race rotatable around the piston and the inner race.

17. The vehicle powertrain subassembly of claim 16, wherein each fin of the plurality of fins is spaced equidistantly around the outer perimeter of the outer race.

18. The vehicle powertrain subassembly of claim 17, further comprising a piston cylinder disposed concentrically around the piston, the piston operable to move axially within the piston cylinder; and wherein the clutch assembly comprises a diaphragm spring, the clutch release mechanism configured to apply pressure to the diaphragm spring to decouple the transmission input shaft and the engine output shaft.

19. The vehicle powertrain subassembly of claim 18, further comprising a supply channel configured to supply fluid pressure to the clutch release mechanism and a bleed stem configured to remove air from the clutch release mechanism.

20. A vehicle powertrain subassembly for use with a manual transmission, the vehicle powertrain subassembly comprising:
    a clutch assembly having a diaphragm spring and configured to selectively connect an engine output shaft to a transmission input shaft for common rotation;
    a clutch release mechanism configured to selectively release the engine output shaft from the transmission input shaft, the clutch release mechanism comprising:
        an actuator bearing configured to rotate around a central axis;
        a piston operable to move in an axial direction along the central axis, the piston operable to press the actuator bearing against the diaphragm spring of the clutch assembly to release the engine output shaft from the transmission input shaft; and
        a plurality of angular fins disposed around an outer surface of the actuator bearing and configured to rotate with the actuator bearing about the central axis; and a bell housing surrounding the clutch assembly and the clutch release mechanism.

* * * * *